March 28, 1961 D. L. CANNADY, JR 2,976,889
RESINOUS COMPOSITIONS AND TUBULAR
MEMBERS PREPARED THEREFROM
Filed Nov. 25, 1958

WITNESSES

INVENTOR
Daniel L. Cannady, Jr.
BY
ATTORNEY

United States Patent Office 2,976,889
Patented Mar. 28, 1961

2,976,889

RESINOUS COMPOSITIONS AND TUBULAR MEMBERS PREPARED THEREFROM

Daniel L. Cannady, Jr., Allendale, S.C., assignor to Westinghouse Electric Corporation, East Pittsburgh, Pa., a corporation of Pennsylvania Filed Nov. 25, 1958, Ser. No. 776,275

2 Claims. (Cl. 138—141)

This invention relates to resinous compositions to be employed in preparing resinous tubular members and particularly to tubes having relatively thick walls, and to the tubular members thus produced.

Resinous tubular member have been used extensively as electrical insulation in electrical apparatus such as transformers, switchgear and the like.

In many instances, the resinous tubular members are subjected to extremely high voltages and are required to support great physical loads, and in order to properly and satisfactorily perform these functions, it is necessary that the tubular members have exceptional strength for all wall thicknesses. For such uses, relatively thick walled tubular members must be available having a highly homogeneous, solid and sound structure. Thus, the tubular members must be free from cracks, air pockets and like imperfections to meet the rigid requirements of the electrical industry.

Good electrical properties and physical properties have been obtained in relatively thin-walled tubular members prepared from paper sheeting such as kraft paper and an applied thermoset resin such, for example, as a straight phenolic resin. For high electrical properties the wall thickness of such tubular members is limited by the perfection of the resulting product. The inner diameter of the tube is a factor in preparing satisfactory heavy walled tubes. In preparing such tubular members, attempts to increase the wall thickness beyond about ⅛ inch wall thickness for 1 inch I.D. tube often have resulted in circumferential cracks and other imperfections developing in the tubular member. Cracks reduce the physical strength of the tubular members and result in undesired corona formation at these areas when associated with high voltage conductors.

This invention is particularly directed to the preparation of sound, homogeneous thick walled tubular members having an inner diameter in excess of about one inch, which tubular members are capable of supporting great physical loads and withstanding extremely high voltages.

The object of this invention is to provide sound, homogeneous laminated tubular members having relatively thick walls, which tubular members are prepared from laminations of paper sheet material impregnated with and bonded together into unitary members by a thermoset resin composition comprising a phenolic resin and a glycidyl polyether.

Another object of this invention is to provide a resinous composition adapted for preparing tubular members having relatively thick walls, which tubular members are sound and homogeneous and possess good electrical properties and physical properties, the said resinous composition comprising a phenolic resin and a glycidyl polyether.

Other objects of this invention will, in part, be obvious and will, in part, appear hereinafter. For a better understanding of the nature and the objects of this invention, reference should be had to the following detailed description and drawing, in which.

Figure 1:
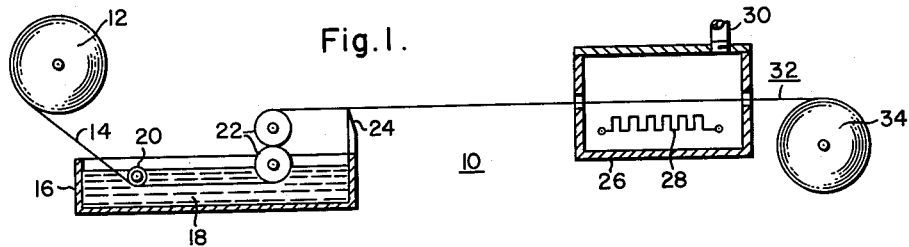
Figure 1 is a schematic view of apparatus for applying resin varnish to fibrous sheet material.

In accordance with this invention, it has been discovered that sound, homogeneous rolled laminated tubular members of all wall thicknesses and particularly those having relatively thick walls and which possess good electrical properties and physical properties, can be prepared from paper sheet material impregnated with a specific resinous composition. This is accomplished by utilizing as the resinous impregnant, a novel resinous composition comprising (a) from 98% to 88% by weight of a thermosettable phenolic resin and (b) from 2% to 12% by weight of a glycidyl polyether or epoxide resin. A volatile solvent is employed in admixture with (a) and (b) to provide an impregnating varnish. The volatile solvent is subsequently removed by the application of heat prior to the preparation of the tubular member.

The phenolic resin referred to may be a conventional thermosettable, laminating phenolic resin having a moderate greenness prepared by reacting phenol, cresol or cresylic acid with formaldehyde, paraformaldehyde, or other polymers thereof. As is well known in the art, cresylic acid comprises a mixture of varying composition of cresols and xylenols. However, exceptionally good results are obtained by using a phenolic resin prepared by reacting 1 mol of phenol and from 0.9 mol to 1.7 mols of formaldehyde in a closed reaction vessel under reflux conditions for at least one hour, the reaction being catalyzed by an alkaline catalyst such as ammonia in an amount of up to 5% by weight based on the phenol and then vacuum dehydrated at a temperature not exceeding 100° C. A volatile solvent such as ethanol, toluol or xylol is added to the resin to produce an impregnating varnish. The solvent to resin solids ratio may be varied from 40% to 60%, by weight.

EXAMPLE I

The following is an example of the preparation of a preferred thermosettable phenolic resin that may be employed in carrying out this invention. Into a steam heated reaction kettle there are introduced the following:

Phenol (hydroxybenzene) __ 1104 pounds (11.74 mols)
Formaldehyde (37%) _____ 1040 pounds (12.82 mols)
Ammonia (28%) _____ 30 pounds.

These materials are reacted in the steam heated reaction vessel at a temperature of approximately 100° C. under reflux conditions for a period of about 1½ hours. The mixture is then vacuum dehydrated under a vacuum of about 28 inches of mercury. The vacuum pressure is gradually increased to about 28 inches of mercury and when the temperature reaches 120° C. the dehydration is stopped. The resin is cooled to room temperature and about 690 pounds of ethanol are added. The resulting phenolic resin varnish has a specific gravity at 25° C. of from 1.055 to 1.070, a viscosity at 25° C. of from 250 to 500 centipoises, a set time of 13 to 16.5 minutes at 153° C., and a recoverable solids content of from 51% to 54%.

The glycidyl polyethers, also known as epoxy or epoxide resins employed in producing the resinous composition of this invention, may be prepared by reacting predetermined amounts of at least one polyhydric phenol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable includes those wherein the phenol nuclei are joined by carbon bridges, such, for example, as 4,4'-dihydroxy-diphenyl-dimethyl-methane (referred to hereinafter as bisphenol A) and 4,4'-dihydroxy-diphenyl-methane. In admixture with the named polynuclear phenols, use also may be made of those polynuclear phenols wherein the phenol nuclei are joined by sulfur bridges such, for example, as 4,4'-dihydroxy-diphenyl-sulfone.

While it is preferred to use epichlorohydrin as the epihalohydrin in the preparation of the resinous polymeric epoxide starting materials of the present invention, other epihalohydrins, for example, epibromohydrin may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The resinous polymeric epoxide suitable for use in this invention has a 1,2-epoxy equivalency greater than 1.0. By epoxy equivalency reference is made to the number of 1,2-epoxy groups contained in the average molecule of the glycidyl ether.

Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers thus is a value between 1.0 and 2.0. In some cases, the epoxide equivalency is given in terms of epoxide equivalents in 100 grams of the resin, and this may vary from about 0.03 to 0.70. Also, epoxide equivalent is often expressed as the number of grams of resin containing one equivalent of epoxide, and will range from about 130 to about 3300.

Resinous polymeric epoxides or glycidyl polyethers suitable for use in accordance with this invention may be prepared by admixing and reacting from one mol to two mol proportions of epihalohydrin, preferably epichlorohydrin, with about one mol proportion of bisphenol A in the presence of at least a stoichiometric excess of alkali based on the amount of halogen.

To prepare the resinous polymeric epoxides, aqueous alkali, bisphenol A and epichlorohydrin are introduced into and admixed in a reaction vessel. The aqueous alkali serves to dissolve the bisphenol A with the formation of the alkali salts thereof. If desired, the aqueous alkali and bisphenol A may be admixed first and then the epichlorohydrin added thereto, or an aqueous solution of alkali and bisphenol A may be added to th epichlorohydrin. In any case, the mixture is heated in the vessel to a temperature within the range of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali. The resulting epoxy resins may be liquid or solid at room temperature.

Various epoxy resins have given good results. Thus, the following may be used with success.

EXAMPLE II

An epoxide resin which has a melting point of 8–12° C., an epoxide equivalency of 190 to 210, and a viscosity of Z5 to 6+ on the Gardner-Holdt scale. This resin is available commercially as Epon 828.

EXAMPLE III

An epoxide resin which has a melting point of 64–67° C., an epoxide equivalency of 450 to 525, and a 40% solution in butyl Carbitol has a viscosity of C–G on the Gardner-Holdt scale. This resin is commercially available as Epon 1001.

EXAMPLE IV

An epoxide resin which has a melting point of 97–103° C., an epoxide equivalency of 905 to 985, and a 40% solution in butyl Carbitol has a viscosity of R–T on the Gardner-Holdt scale. This resin is available commercially as Epon 1004.

EXAMPLE V

An epoxide resin which has a specific gravity (23° C./ 23° C.) of from 1.16 to 1.18, an epoxy value from 0.440 to .480 epoxide equivalents per 100 grams of resin, and a viscosity of Z–6 on the Gardner-Holdt scale. This resin is available commercially as Araldite 6020.

The following example is illustrative of the preparation of the resinous composition employed in preparing tubular members of this invention.

EXAMPLE VI

To 100 parts by weight of the phenolic resin varnish of Example I, there are added 4.4 parts by weight, of the epoxy resin of Example II. The epoxy resin is heated to about 80° F. prior to addition to the phenolic resin varnish to accelerate thorough admixing of the two components. The components are thoroughly admixed. The resulting resin varnish composition has a specific gravity at 25° C. of 1.063 to 1.088, a viscosity at 25° C. of from 300 to 550 centipoises, a set time at 153° C. of from 14 to 18.5 minutes, a pH at 25° C. of from 7.6 to 8.1 and a recoverable solids content of about 55%.

Referring now to Fig. 1 of the drawing, there is illustrated apparatus 10 for the treatment of fibrous sheet material, which may be kraft paper, alpha cellulose paper, absorbent sulphite paper or an equally strong paper sheet material to be employed in preparing the tubular members of this invention. A roll 12 of paper sheet material is disposed at one end of apparatus 10. The paper sheet material 14 is withdrawn from the roll 12 and passes into a varnish dip pan 16 containing a resin varnish 18 which comprises the resin varnish composition of Example VI, beneath a roller 20, immersed in varnish 18 so that the paper sheet material 14 is soaked in the resin varnish 18. The soaked paper sheet material is withdrawn from the resin varnish 18 and passes between a pair of squeeze rollers 22 where the amount of applied varnish composition is controlled by the setting of the rolls. The bottom side of the treated paper sheet material is drawn over a scraper 24 so as to remove any adhering superficial phenolic resin varnish from that one side of the paper. In order to substantially reduce the amount of resin on the scraped surface of the paper sheet material, it is preferred that the treated sheet material be drawn over a second scraper (not shown).

The sheet of paper is impregnated, after scraping, to a resin ratio of from about 2.0 to 2.6, the preferred resin ratio being within the relatively narrow limits of 2.1 to 2.3. Resin ratio is defined as the weight of the sheet material plus the weight of the resin to the weight of the untreated sheet material.

After scraping, the paper sheet material with the applied resinous varnish composition then passes into an oven 26 having electrical heating elements 28 or other suitable heating means where the solvent from the varnish is removed. Solvent vapors escape through the stack 30 of the oven. The heat treatment is carried out so as to provide the treated sheet of fibrous material with a greenness of from about 2% to 20%, with the preferred greenness being within the range of from 3% to 8%. The greenness is determined by placing a stack of small pieces of the resin treated paper material in a hot press and pressing it at a temperature of 175° C. and at a pressure of 1000 pounds per square inch for five minutes, and then weighing the amount of resin that is forced out of the stack, that is, the resin that extends beyond the paper sheets proper, and determining the proportion of the exuded resin to the total weight of the sample.

The product withdrawn from the oven 26 is a sheet 32 of paper carrying B-stage resin composition and may be formed into a roll 34, cut or otherwise handled.

Figure 2:
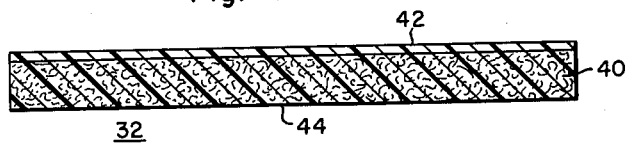
Fig. 2 is an enlarged fragmentary cross-section view of a sheet of paper impregnated with B-stage resin.

As illustrated in enlarged cross section in Fig. 2, the treated sheet 32 comprises a body 40 completely impregnated with resin composition in the B-stage and carrying on its upper surface a surface layer 42 of bonding resin while the bottom surface 44 of the sheet is substantially free from any superficial resin. There usually is present on the surface 44, however, a relatively small amount of resin, it not being practical to remove all of the resin with the scrapers. It is desirable, however, that as little resin as possible be present in the bottom surface 44 of the treated sheet 32.

Thereafter, the sheet 32 of paper with the applied B-stage resin composition is passed over a hot roll 46, which is heated to a temperature of from about 160° C. to 170° C., to fuse the B-stage resin just immediately before the sheet 32 is rolled on a mandrel. The treated paper sheet material 32 is allowed to pass over the hot roll 46 at a rate slow enough to allow substantially all of any remaining volatile material to be removed from the treated material while the resin is still fused before it comes into contact with the mandrel and becomes a part of the tube proper. Care must be taken to prevent complete cure or hardening of the resin before it is wrapped onto the mandrel.

Figure 3:
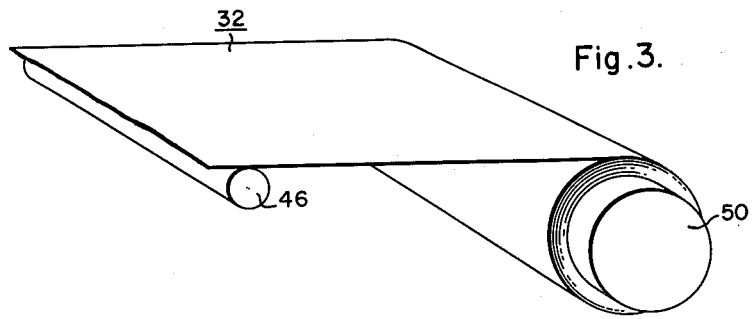
Fig. 3 is a view, in perspective, of a tube being rolled.

Referring to Fig. 3 of the drawing, there is illustrated schematically, this stage of the process. The treated sheet 32 is rolled onto a steel mandrel 50, preferably a solid mandrel. The surface of the mandrel 50 is initially provided with a coating of lubricant or other parting medium to enable the ultimately formed tubular member to be separated readily therefrom. As illustrated, the treated sheet 32 is passed over hot roll 46 and wrapped about the mandrel so that the surface layer of resin 42 on the sheet of fibrous material is inwardly disposed. In rolling the treated sheet 32 on the mandrel 50, as much tension and pressure should be applied as is possible without tearing the sheet. A tension of about 8 pounds per lineal inch has proved satisfactory both for 3.5 mil kraft paper and for 5 mil absorbent sulphite paper. In addition rollers may be applied about the mandrel 50 to compress the applied layers of paper thereon, if desired.

Figure 4:
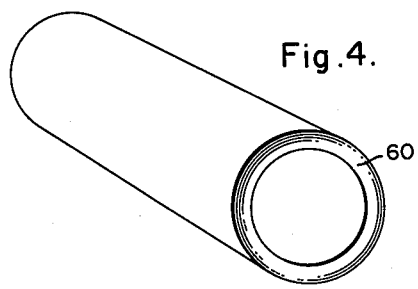
Fig. 4 is a view, in perspective, of the finished tube.

The mandrel with the wrapped sheet 32 applied thereon to a desired thickness is then put into an oven heated to a temperature of from about 140° C. to 160° C., or higher, if desired. In a period of time of from 30 minutes to several hours depending on the temperature, the thickness of the tubing on the mandrel and other factors, the B-stage resins will have first fused and then hardened into a final insoluble and infusible C-stage resin uniting the laminations of paper sheet material on the roll tube into a homogeneous high density, bonded structure thoroughly impregnated with the resin. Thereafter, the mandrel may be removed by withdrawing the mandrel through a close fitting collar abutting the end of the cured tube. Except for sanding or machining to size and desired surface finish, ordinarily there will be little further processing required in order to produce the fully cured, laminated tubular member 60 as illustrated in Fig. 4 of the drawing.

It will be appreciated that collapsible mandrels which are well known in the art may be employed instead of the solid mandrel illustrated.

The following examples illustrate the preparation of tubular members in accordance with this invention.

EXAMPLE VII

The resinous varnish composition of Example VI is used to impregnate 5 mil absorbent sulphite paper to a resin ratio of about 2.3. The sulphite paper is treated in the manner hereinbefore described and the applied resin is advanced to the B-stage wherein the treated sulphite paper has a greenness of about 5%. The treated sulphite paper is passed over a hot roll heated to 170° C. to insure removal of any remaining volatile material that may be present in the applied resin composition and to fuse the applied resin composition. The treated paper is then rolled on a steel mandrel under a tension of 8 pounds per lineal inch in the manner hereinbefore described, and cured in an oven at a temperature of about 150° C. for three hours. The resulting laminated tubular member has a one inch inside diameter and a one and one-quarter inches outside diameter, or a wall thickness of 1/8 of an inch.

Several tubular members were prepared in the manner described in Example VII and subjected to various tests to determine their electrical and physical properties. The results of these tests are set forth in Table I below.

Table I

| Test performed: | Results |
|---|---|
| Density | 1.31 |
| Dielectric strength, short time | 567 volts/mil |
| Dielectric strength, short time—Tube immersed in 50° C. water for 48 hours | 362 volts/mil |
| Dielectric strength, step by step | 312 volts/mil |
| Dielectric strength, step by step—Tube immersed in 50° C. water for 48 hours | 165 volts/mil |
| Water absorption, immersed in 23° C. water for 24 hours | 0.95 |
| Compressive strength | 21,350 p.s.i. |
| Dissipation factor, $10^6$ cycles/sec | 0.0462 |
| Dielectric constant, $10^6$ cycles/sec | 5.01 |

A total of 130 tubular members having a length of 48 inches, an inside diameter of 4 7/16 inches and a wall thickness of 1 5/16 inches were prepared from the resinous composition of this invention and in accordance with this invention. The tubular members were sound, homogeneous and free from cracks and met with all the rigid requirements of the electrical industry. It has not been possible to prepare satisfactory tubular members of this size using the heretofore best known resinous composition for the preparation of thick-walled tubes.

The tubular members of this invention are particularly adapted for use as electrical insulating members. However, it will be appreciated that the tubes may be employed for non-electrical uses where high strength tubes are required.

While the present invention has been described with respect to tubes of circular cross section, it should be understood that tubes having other cross sections, such as octagonal, hexagonal, elliptical, or the like, may be produced in a similar manner with equally satisfactory results.

While this invention has been described with particular reference to cellulosic paper sheet material, it will be understood that other fibrous sheet material such as cotton duck, nylon, cloth, glass cloth, asbestos paper and the like may be employed.

It will be understood that the above examples and description are illustrative and not in limitation of the invention.

I claim as my invention:

1. A sound homogeneous thick-walled tubular member having high strength and good electrical properties comprising a plurality of layers of fibrous sheet material with a thermoset resin composition impregnating each of the layers, the thermoset resin also uniting the layers, said thermoset resin composition being the heat-treated product of a resinous composition consisting essentially of (a) from 98% to 88% by weight of a thermosettable resinous product derived by reacting one mol of phenol and from 0.9 mol to 1.7 mols of formaldehyde in the presence of an alkali catalyst under reflux conditions for at least one hour, and then vacuum dehydrated at a temperature not exceeding 100° C., and (b) from 2% to 12% by weight of a glycidyl polyether derived from a dihydric phenol and an epihalohydrin.

2. A sound homogeneous thick-walled tubular member having high strength and good electrical properties comprising a plurality of layers of paper sheet material with a thermoset resin composition impregnating each of the layers, the thermoset resin also uniting the layers, the resin composition comprising from 100% to 160% of the weight of the paper, said thermoset resin composition being the heat-treated product of a resinous composition consisting essentially of (a) from 98% to 88% by weight of a thermosettable resinous product derived by reacting one mol of phenol and from 0.9 mol to 1.7 mols of formaldehyde in the presence of an alkali catalyst under reflux conditions for at least one hour, and then vacuum dehydrated at a temperature not exceeding 100° C., and (b) from 2% to 12% by weight of a glycidyl polyether derived from a dihydric phenol and an epihalohydrin.

References Cited in the file of this patent

UNITED STATES PATENTS

| | | |
|---|---|---|
| 2,307,588 | Jackson et al. | Jan. 5, 1943 |
| 2,521,911 | Greenlee | Sept. 12, 1950 |
| 2,699,413 | Seagren et al. | Jan. 11, 1955 |
| 2,711,982 | Straka | June 28, 1955 |
| 2,795,241 | Caldwell | June 11, 1957 |
| 2,801,945 | Ragers et al. | Aug. 6, 1957 |